United States Patent
Ghani et al.

(10) Patent No.: US 9,460,193 B2
(45) Date of Patent: Oct. 4, 2016

(54) CONTEXT AND PROCESS BASED SEARCH RANKING

(75) Inventors: Rayid Ghani, Chicago, IL (US); Divna Djordjevic, Atibes (FR); Chad M. Cumby, Chicago, IL (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 385 days.

(21) Appl. No.: 13/544,551

(22) Filed: Jul. 9, 2012

(65) Prior Publication Data

US 2013/0041896 A1 Feb. 14, 2013

(30) Foreign Application Priority Data

Aug. 12, 2011 (EP) .................................. 11290372

(51) Int. Cl.
G06F 17/30 (2006.01)

(52) U.S. Cl.
CPC ... *G06F 17/30654* (2013.01); *G06F 17/30651* (2013.01); *G06F 17/30675* (2013.01); *G06F 17/30699* (2013.01); *G06F 17/30867* (2013.01)

(58) Field of Classification Search
CPC .......................... G06F 17/30; G06F 17/30867
USPC ........................................ 707/603, 723, 748
See application file for complete search history.

(56) References Cited

U.S. PATENT DOCUMENTS

| | | | |
|---|---|---|---|
| 6,041,311 A * | 3/2000 | Chislenko et al. | 705/26.7 |
| 2002/0171646 A1 * | 11/2002 | Kandogan | 345/440 |
| 2003/0154186 A1 * | 8/2003 | Goodwin et al. | 707/1 |
| 2007/0185865 A1 | 8/2007 | Budzik et al. | |
| 2007/0282684 A1 * | 12/2007 | Prosser et al. | 705/14 |
| 2008/0195586 A1 | 8/2008 | Arnold et al. | |
| 2009/0204581 A1 | 8/2009 | Lim | |
| 2011/0010323 A1 * | 1/2011 | Wang et al. | 706/46 |
| 2011/0225115 A1 * | 9/2011 | Moitra et al. | 706/50 |
| 2012/0317097 A1 * | 12/2012 | Tseng | G06F 17/30864 707/722 |
| 2012/0323876 A1 * | 12/2012 | Lymberopoulos | G06F 17/30867 707/706 |

FOREIGN PATENT DOCUMENTS

| | | |
|---|---|---|
| EP | 1 050 830 A2 | 11/2000 |
| EP | 1 843 256 A1 | 10/2007 |
| WO | 2007124430 A2 | 11/2007 |

OTHER PUBLICATIONS

Speretta, Micro, and Susan Gauch. "Personalized search based on user search histories." Web Intelligence, 2005. Proceedings. The 2005 IEEE/WIC/ACM International Conference on. IEEE, 2005.*
Chau, Michael, Daniel Zeng, and Hinchun Chen. "Personalized spiders for web search and analysis." Proceedings of the 1st ACM/IEEE-CS joint conference on Digital libraries. ACM, 2001.*
Zamir, Oren, and Oren Etzioni. "Grouper: a dynamic clustering interface to Web search results." Computer Networks 31.11 (1999): 1361-1374.*
Extended European Search Report for Application No. 11290372.9 issued Feb. 3, 2012.
"Communication pursuant to Art. 94(3) EPC" on European Patent Application EP 11 290 372.9, European Patent Office, dated Aug. 18, 2015, 7 pages.

* cited by examiner

*Primary Examiner* — Nan Hutton
(74) *Attorney, Agent, or Firm* — Mannava & Kang, P.C.

(57) ABSTRACT

A search ranking system may include a context mining module to determine a set of contexts based on profile of information rankable by the system and an access history of users that have accessed at least some of the information. A context detection module may compare an association of a user conducting a search with one or more of the contexts to thereby rank search results based on the comparison.

20 Claims, 12 Drawing Sheets

CONTEXT AND PROCESS BASED SEARCH RANKING

BACKGROUND

Organizations and other institutions may store information, for example, in enterprise data warehouses. Enterprise search tools may be used to perform knowledge-based tasks such as, for example, data retrieval and analysis. Search tools may rank search results based on, for example, document content. However, depending on a user's specific needs, the search results may not be adequately ranked. For example, search results may be ranked based on a number of keyword matches in a document. However, the number of keyword matches may not be indicative of a user's specific search requirements.

BRIEF DESCRIPTION OF DRAWINGS

The embodiments are described with reference to the following figures.

DETAILED DESCRIPTION OF EMBODIMENTS

Figure 1:
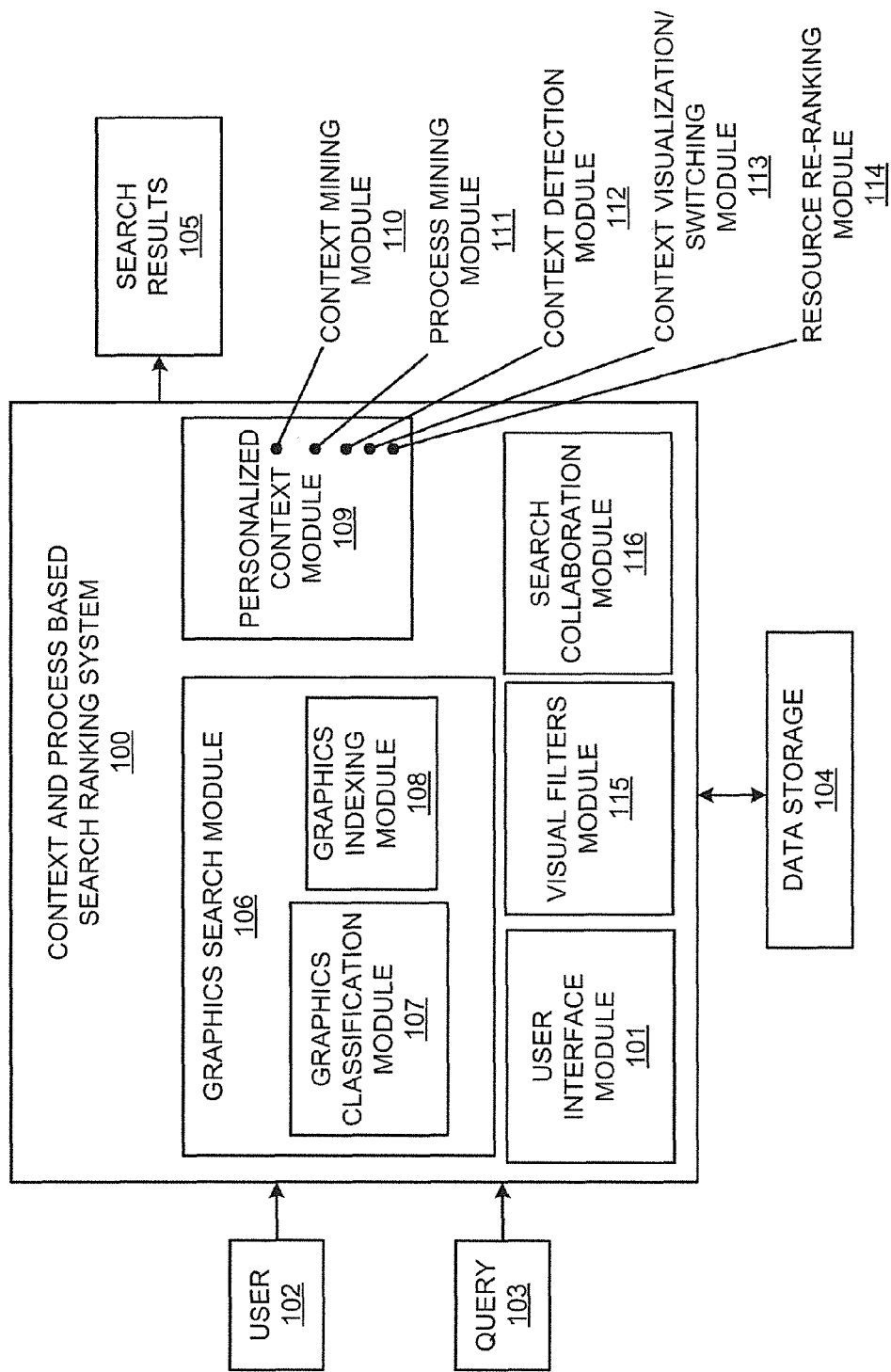
FIG. 1 illustrates a system diagram for a context and process based search ranking system, according to an embodiment.

For simplicity and illustrative purposes, the principles of the embodiments are described by referring mainly to examples thereof. In the following description, numerous specific details are set forth in order to provide a thorough understanding of the embodiments. It will be apparent that the embodiments may be practiced without limitation to all the specific details. Also, the embodiments may be used together in various combinations.

1. Overview

Organizations and other institutions may use solutions such as, for example, enterprise data warehouses to store information. In order to perform knowledge-based tasks such as, for example, data retrieval and analysis, enterprise search tools may be used to retrieve and analyze data to rank search results based on document content. However, a ranking suitable for one user may not be suitable for another user. Moreover, depending on factors such as, for example, time, location and a user's particular needs, background or position with an organization, a ranking suitable to one user versus another, or to the same user under different conditions, may be inadequate if the foregoing factors are not taken into consideration. The foregoing factors may be broadly related to a user's context. For example, a user's context may include factors related to, for example, the user's particular needs, background or position with an organization, which may also include factors related to a task at hand. A user's task requirements may include factors related to, for example, the timing, location and requirements of a task. Further, a search process may include factors related to, for example, a sequence of information accessed or otherwise used by a user.

For a set of search results, a user may need context-sensitive access to information that is tailored to the user's particular needs, for example, for a specific task. The context and process based search ranking system described herein may provide customized and integrated context and process mining, and visualization of search results and search manipulation options. The system may provide for personalization of enterprise search results based on a user's particular needs, such as, for example, for performing specific tasks. It is noted that when appropriate, all references to a user of the system may likewise be applicable to multiple users of the system. As described in further detail below, the system may include a graphics search module to allow a user to search for graphics of specific types. A personalized context module may allow personalized re-ranking of search results based on automatically inferred contexts. A visual filters module may allow a user to re-rank documents based on visual filters. Since the visual filters may provide for re-ranking of documents, as opposed to elimination of documents, the visual filters may also be referred to as visual 'soft' filters. A search collaboration bar may allow users to collaborate with and contact other users in an organization who may be searching for similar information or working in similar context based on context detection as described below.

The context and process based search ranking system described herein may facilitate and expedite search and browsing of enterprise resources, for example, by generating previews of documents and presenting them via a user interface. The system may provide a user with reusable groups of information as opposed to monolithic documents. The system may also provide a user with context and process based access to information that may be automatically tailored to the particular needs of the task a user or multiple users may be engaged in.

The context and process based search ranking system may include a context mining module to determine a set of contexts based on profile of information rankable by the system and an access history and profile of users that have accessed at least some of the information. The system may include a context detection module to compare an association of a user conducting a search with one or more of the contexts to thereby rank search results based on the comparison. For example, the information may include documents rankable by the system. The context mining module may further determine the set of contexts based on a profile of at least one of the users. Therefore the set of contexts may include profile of information rankable by the system, an access history of users that have accessed at least some of the information, and a profile of at least one of the users. The context detection module may compare the association of the user conducting the search with one or more of the contexts based on a user profile for the user conducting the search and access history of users. As described herein, the graphics search module may classify and index graphics contained in the information. The context mining module may generate an association score for each of the contexts with each of the users, and a further association score for each of the contexts with the information. The association scores may be used by the context detection module to rank the search results. The context detection module may also determine an association score for the user based on comparison of the user profile with the contexts of each of the users, a further association score for search result information based on comparison of the search result information with the contexts, and an overall association score based on the association scores to rank the search results. A process mining module may rank the search results by comparing a sequence of search result information reviewed by the current user and sequences discovered from access history of users across an organization. The personalized context module may generate personalized clusters based on the contexts, and a resource re-ranking module may re-rank the search results based on manipulation of at least one of the personalized clusters. The visual filters module may generate filters related to most frequent metadata values related to a query by the user, and the search results may be re-ranked by manipulation of co-occurring metadata values.

The system may also be applicable to web search for documents on the open web generally. In this regard, the system may obtain inputs from users as described below for obtaining user-specific information, and further from a predefined set of users for obtaining historical search data.

The systems and methods described herein provide a technical solution to the technical problem of accessing and analyzing document repositories such as enterprise data warehouses to generate context and process based search results. In many instances, given the size and rate of growth of such document repositories, manual generation of context and process based search results is not a viable solution and may in fact be impossible, when simultaneously taking into consideration factors such as, for example, a search time, location and a user's particular needs, background or position with an organization. The systems and methods according to the embodiments provide the technical solution of providing context and process based search results using, for example, graphic search capabilities, personalized re-ranking of search results, re-ranking of search results based on visual filters, and collaboration with other system users who may be searching for similar information.

2. System

FIG. 1 illustrates a context and process based search ranking system 100, according to an embodiment. Referring to FIG. 1, the system 100 may include a user interface module 101 which may be used by a user 102 to enter a query 103 pertaining to data in a data storage 104. The modules and other components of the system 100 may include machine readable instructions, hardware or a combination of machine readable instructions and hardware. The data storage 104 may be an enterprise data warehouse. The user interface module 101 may be used with other modules and components of the system 100 for query input, and to display generated and re-ranked context and process based search results 105 as described below. For example, based on the query 103, the user 102 may be provided with a set of search results 105 that are specific to the user based on the user's current context. The system 100 may further include a graphics search module 106 to allow the user 102 to search for graphics of specific types as described below. In order to provide access to specific and reusable graphics, the graphics search module 106 may include a graphics classification module 107 and a graphics indexing module 108. A personalized context module 109 may allow personalized re-ranking of the search results 105 based on automatically inferred contexts. The personalized context module 109 may include a context mining module 110, a process mining module 111, a context detection module 112, a context visualization/switching module 113 and a resource re-ranking module 114. A visual filters module 115 may allow the user 102 to re-rank documents based on visual filters. A search collaboration module 116 may allow the user 102 to collaborate with and contact other users in an organization who are looking for similar information.

An example of a screen display 120 of the system 100 is described with reference to FIGS. 1-3.

Figure 2:
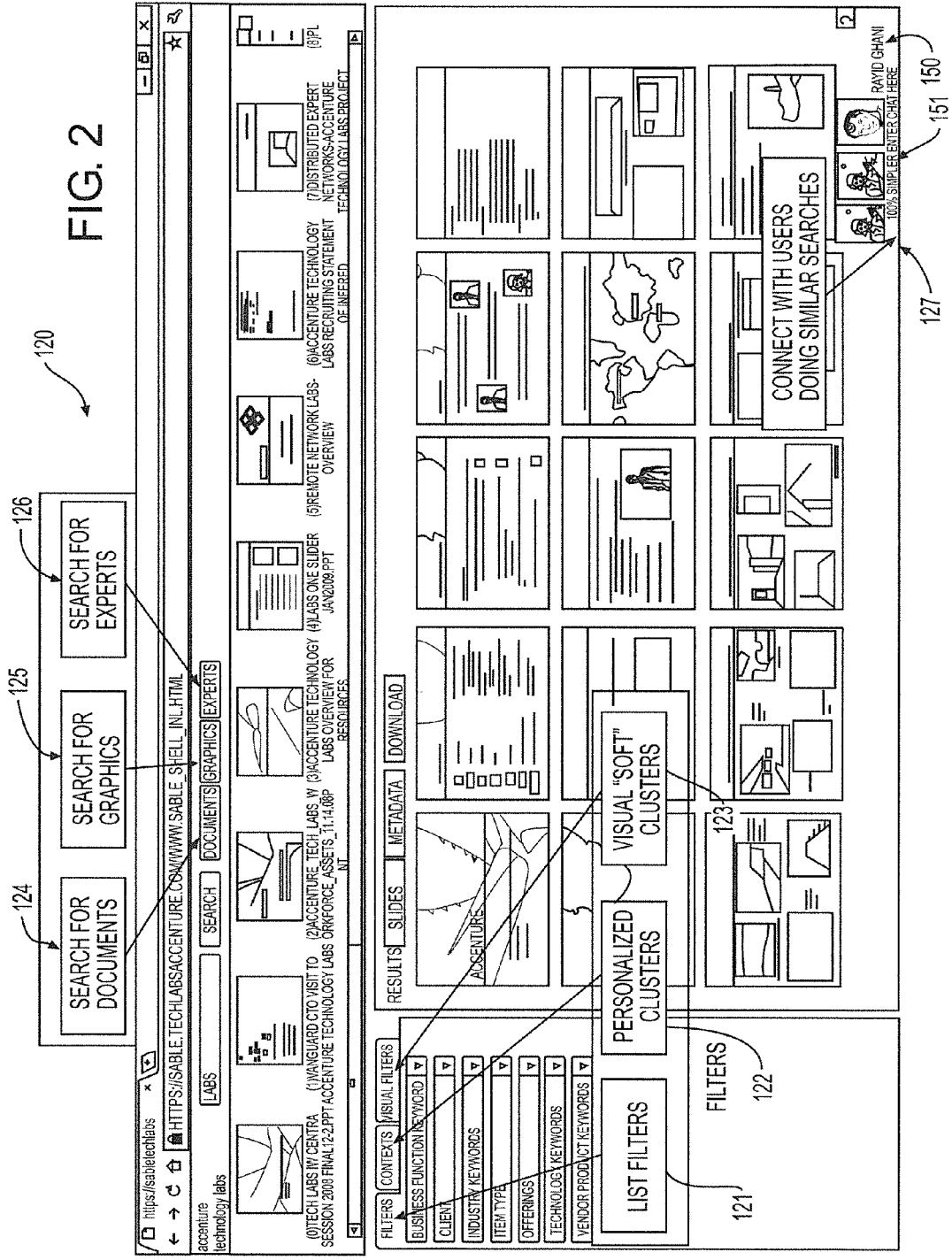
FIG. 2 illustrates an example of a screen display for the context and process based search ranking system, illustrating, for example, visual previews, personalized search results and options for modifying search results.
Figure 3:
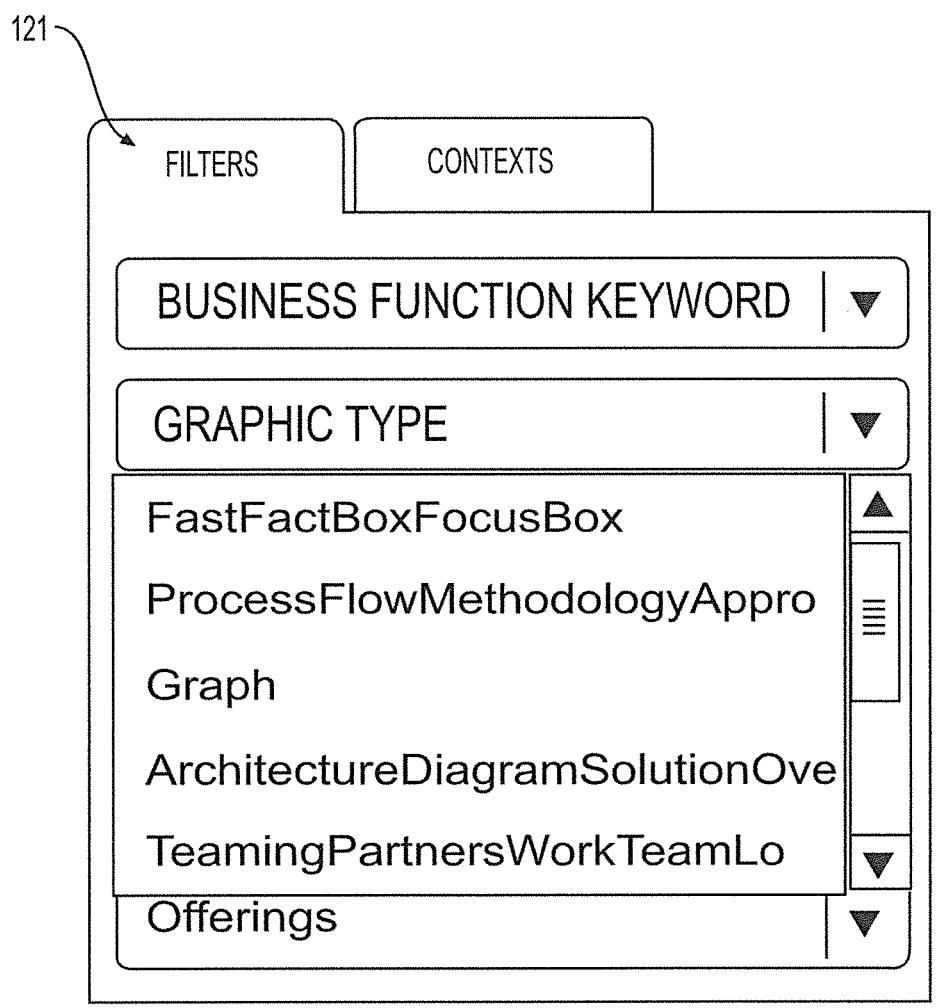
FIG. 3 illustrates an example of a section of a screen display for the context and process based search ranking system, illustrating, for example, filter options.
Figure 4:
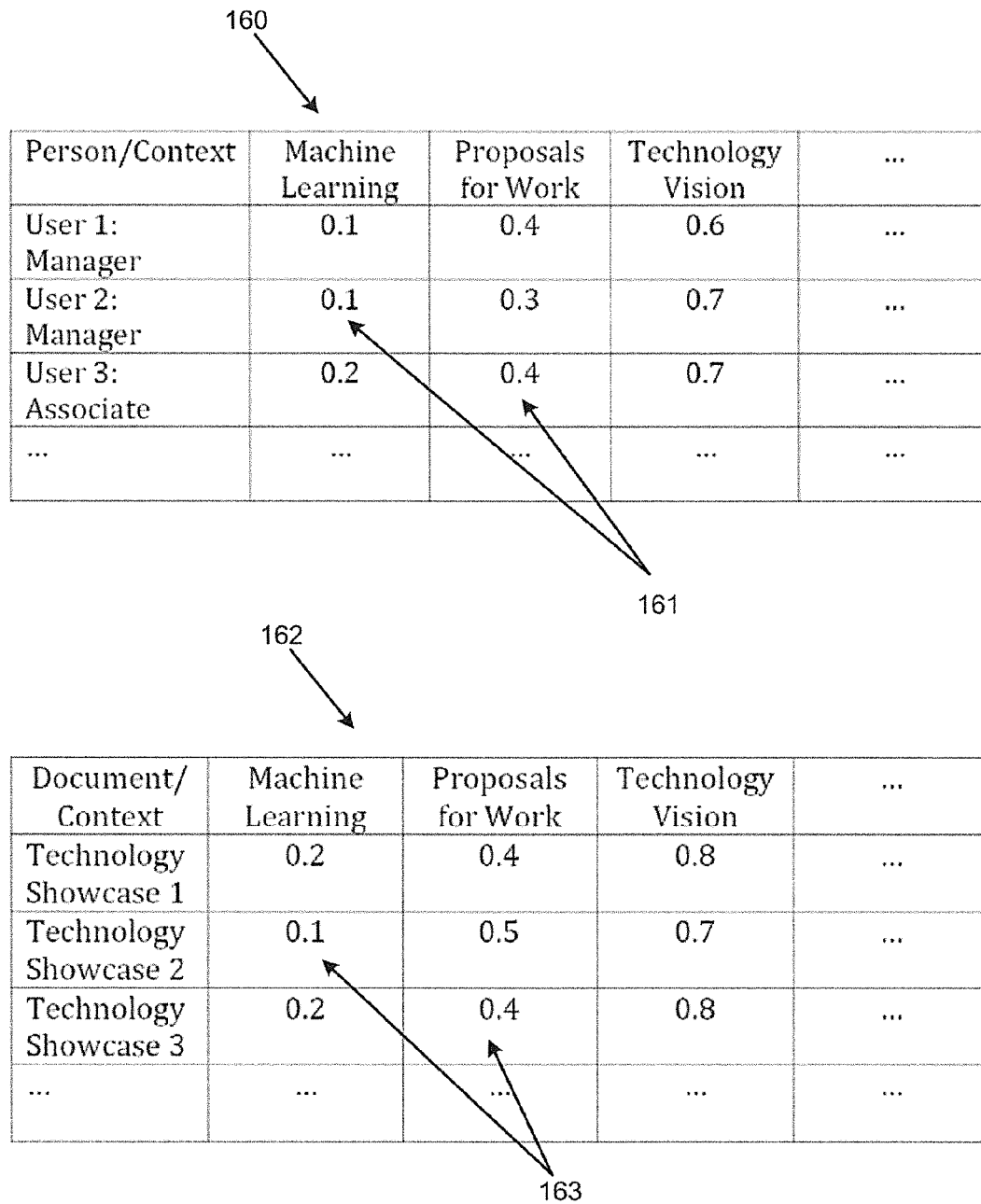
FIG. 4 illustrates an example of membership scores for certain <person, context> pairs and <document, context> pairs, respectively, for <person, context> and <document, context> matrices.

Referring to FIG. 2, the user interface module 101 may include the screen display 120. The screen display 120 may include menu options for listing filters by selecting filters option 121, access to personalized clusters by selection of contexts option 122, and access to visual clusters by selection of visual filters option 123. Menu options for documents at 124, graphics at 125 and experts at 126 may be selected to respectively search for documents, graphics and experts. As described below, a search collaboration bar 127 may allow connection with users performing similar searches.

The graphics search module 106 is described with reference to FIGS. 1-3.

Organizations and other institutions may use digital libraries that may include business documents including text data and graphics. For example, graphics may include process flow diagrams, fast fact boxes, organizational charts, tables, photographs, architecture diagrams, logos, and graphs that may be reused by users across an enterprise. These graphics may be embedded in documents but not individually available for users to search and retrieve for use in new documents. Even if a user knows the specific type of graphic they are searching for, such as, for example, an architecture diagram for a MICROSOFT ENTERPRISE search solution, the user may have to search for documents, and manually browse hundreds of pages of content in an effort to find the relevant architecture diagram. The system 100 may thus provide for access to specific and reusable graphics as described below.

As discussed above, in order to provide access to specific and reusable graphics, the graphics search module 106 may include the graphics classification module 107 and the graphics indexing module 108. The module 107 may use a machine learning approach for graphics classification that may automatically extract graphics from documents. The machine learning approach may further classify the graphics into enterprise graphics taxonomy and provide graphics search functionality to augment traditional enterprise search.

The foregoing graphics classification capability provided by the module 107 may be applied to a document repository for extraction and classification of graphics. The graphics indexing module 108 may index the graphics by a search engine and integrate the graphics into the system 100. At the system 100, a user may use the user interface module 101 to enter, for example, a text query and select a graphic type and retrieve relevant graphics. For example, referring to FIGS. 2 and 3, the user 102 may select the filters option 121 to only search for a graphic of a particular type (e.g., graph). The module 108 may index graphics using, for example, text that appears adjacent to or within an image, and the foregoing categories assigned to it by the graphics classification module 107.

The personalized context module 109 is described with reference to FIGS. 1, 2 and 4-7.

The personalized context module 109 may integrate context mining and process mining to deliver personalized results that are relevant to a user and their current context and process. As described above, the personalized context module 109 may include the context mining module 110, the process mining module 111, the context detection module 112, the context visualization/switching module 113 and the resource re-ranking module 114.

The context mining module 110 may run periodically and update a list of generic contexts across all users and resources. For example, the resources may include the data storage 104. The module 110 may perform context building for the system 100 by generally analyzing a database for an organization, and for the users of the database, by ascertaining the skill level of the users, the position level for the users, the users' geographical location and the task that is being performed. The system 100 may capture usage logs and utilize the data to support context modeling through content, network and time aspects of the data. The content aspect of the data may include information about a document repository including lightweight semantics. The lightweight semantics may be, for example, in the form of metadata about content, which may be filled in when the content was uploaded based on predefined taxonomy for an organization. The network aspect of the data may include a structured database of skills information with organizational information. The organizational information may include, for example, company groups, office locations, and promotion levels for each user and a list of self-selected skills, along with proficiency rating and the number of years of proficiency. The time aspect of the data may include a database of search and access logs with timestamps from a corporate enterprise search engine spanning, for example, an organization, and include information related to all members of the organization, documents related to the organization and all actions over a predetermined time interval (e.g., 2 years).

For context modeling, the context mining module 110 may represent an event as a user-U accessing a resource-R (e.g., a document) at time-T. The user-U may be represented as a set of lightweight semantic features of users at an organization based on, for example, user level in an organization, user office location, and a set of user skills. For example, a user-U may be represented as a mid-level manager, located in Chicago, and having proficiency in POWERPOINT. The resource-R may be represented as a model using lightweight semantics in the form of metadata representing, for example, document type, relevant product offering, and relevant industry. Alternatively, the resource-R may be represented as a bag of words representation. The bag-of-words model may be a simplifying assumption used in natural language processing and information retrieval. In this model, a text (e.g., a sentence or a document) may be represented as an unordered collection of words, disregarding grammar and word order.

For each user-U accessing resource-R at time-T, an event E may be represented as <U,R,T>. As a result of context mining performed by the context mining module 110 on all events present in a data set, a list of generic contexts may be obtained for an organization. These contexts may be internally stored as a set of two similarity matrices. One matrix may contain a membership score for each <person, context> pair, and the other matrix may contain a membership score for each <document, context> pair. For example, referring to FIG. 4, a matrix 160 may include a membership score 161 for each <person, context> pair for documents related, for example, to machine learning, proposals for work, technology vision etc. A matrix 162 may include a membership score 163 for each <document, context> pair for documents related, for example, to machine learning, proposals for work, technology vision etc. These matrices may be indexed and stored in memory to expedite contextual information delivery. For a user logging on to the system 100, the <person, context> pair matrix may be used to determine a context specific to the user. The <person, context> pair matrix may also be used to determine a context specific to other users with similar backgrounds. Once the user logs on to the system 100 and performs a search, the <person, context> pair and the <document, context> pair matrices may be used to generate the search results 105, which as described below, may include a ranked list of documents based on the user's current context and further based on other users in the organization who have a similar context. For example, for a user performing a search for "technology labs", referring to FIG. 5, the same documents related to machine learning, proposals for work, technology vision etc., may be retrieved, and ranked based on the user's current context and further based on other users in the organization who have a similar context. Thus the resulting ranked list of documents takes into account a history of all users of an organization who have a similar context to the user currently performing a search.

The process mining module 111 may operate, for example, periodically, to update the list of informal sequences of actions across all users of an organization and resources. Process mining may use the same data as used for context mining. The process mining module 111 may be based on a bottom-up approach using data mining techniques to obtain a probabilistic process model. The module 111 may construct probabilistic temporal models that detect patterns of sequential user actions. For action modeling, a multi-relational clustering approach may be used, where events may be logs, for example, of the employees or users of the system 100 for an organization accessing documents described with a lightweight taxonomy and unstructured text. The module 111 may use, for example, Markov models for discovering frequent sequences of actions. The processes may be internally stored as probabilistic sequences of metadata fields (e.g., itemtype=proposal material-> document_type=powerpoint, where itemtype and document_type may be metadata field types, and proposal material and powerpoint may be metadata field values). This functionality may be integrated into the system 100 to facilitate inference of resources that may be accessed next to expedite the search process.

In an example, the process mining module 111 may account for a sequence of documents, such as, for example, documents A, B, C or D, E, F a user has reviewed. Based on the sequence, the module 111 may build a history of sequential set of probabilities. For example, if a user has reviewed document A, the module 111 may determine the probability the user will next review document B, or E, or F etc. For each document, the module 111 may determine a set of attributes. For example, a document A may pertain to DISNEY, recruiting and SAP, and a document B may pertain to MCDONALDS, HR and ORACLE. Thus the document A may have the attributes, DISNEY, recruiting and SAP, and a document B may have the attributes MCDONALDS, HR and ORACLE. The documents A and B may be converted into metadata indicating, for example, DISNEY is followed by MCDONALDS, DISNEY is followed by HR, and DISNEY is followed by ORACLE. The module 111 may thus determine sequences of metadata elements that follow each other. If a user clicks on document A including the attribute DISNEY, the module 111 may determine the next attributes, the probability a different attribute is next, and locate all documents that contain these attributes. Thus the module 111 may include a matrix of attributes, a matrix of documents and attributes, and by multiplying these matrices, the module 111 may determine a score for every document and its probability of being selected next. For example, for document A pertaining to DISNEY, the module 111 may determine that document B pertaining to MCDONALDS has a high probability of being selected next. Thus based on a set of documents, for example, documents C and D, document C may be assigned a score of 0.9 and document D may be assigned a score of 0.8, and re-ranked in order from highest to lowest score.

The context mining module 110 and the process mining module 111 may operate independently or in conjunction with each other to rank search results based on the context and process related aspects of a search. The context mining module 110 may generate results based on the users' profiles (e.g., a user is a manager, located in Chicago, and works in customer relationship management), a history of document access of other users with similar user profiles, and the document content (e.g., all the graphics or words in the document). For the context mining module 110, the output of the user profiles, history of document access of other users with similar user profiles, and the document content may be a set of contexts. Each context may include users and their association scores of that context, and similarly, documents and their association scores of that context. Thus for the several contexts generated by the module 110, an association score for that user may be determined for a given context. Similarly, for the several contexts generated by the module 110, an association score for a document may be determined for a given context. As described above, the output of the module 110 may include one matrix containing a membership score for each <person, context> pair, and another matrix containing a membership score for each <document, context> pair. Thus for a query A by a user B, the search results 105 may include a ranking of documents based on the foregoing factors analyzed by the module 110. For the process mining module 111, based on a short sequence of documents reviewed by a user, the search results 105 may include a ranking of documents. The context and the process mining modules 110, 111, may also operate in conjunction with each other to generate the search results 105 based on the foregoing factors analyzed by each of the modules.

The context detection module 112 may use a stream of events to perform context detection for the system 100. For example, when the user 102 logs on to the system 100 via the user interface module 101 and inputs the search query 103, the person-to-context similarity of the logged-in user and the document-to-context similarity, for example, of the top 100 documents returned by the user's search query may be used to generate a ranked list of global contexts that may be applicable for the current user and the user's current needs. The context detection module 112 may then use the top n contexts as relevant contexts to rank the search results 105. For example, n may be set to 8 contexts as illustrated in FIG. 5.

The context visualization/switching module 113 may be used to display the discovered contexts through technology for context visualization based on, for example, the SEARCHPOINT interface. The module 113 may be provided a ranked list of contexts that have been identified as most relevant to the user and the user's current information need. These contexts may be displayed in a two-dimensional representation, allowing the user to manually select nearby contexts and obtain new search results. The contexts may be automatically labeled with the top scoring metadata values of the context centroid. The user may have the ability to look at the top contexts and move the focus to signal the user's current context. If the focus is in-between several contexts, the documents retrieved may be re-ranked based on a weighted sum of the nearby contexts. The context visualization/switching module 113 may display the contexts that are inferred to be closest to the user's current context and may allow the user to manually select nearby contexts that result in the re-ranking of search results.

The resource re-ranking module 114 may be used to re-rank search results. For example, the module 114 may be used to re-rank search results when a user uses the context visualization/switching module 113. The search results may be re-ranked using the context and process respectively inferred by the context mining module 110 and the process mining module 111. For each context, the context mining module 110 may have a document-context membership score. Based on the previous documents viewed, for example, k documents viewed, the process mining module 111 may return a probability distribution over the metadata values for the next most likely document of interest. Both of these components (i.e., the document-context membership score and the probability distribution) may be combined to compute a re-ranked list of documents relevant to the current context, for the current user, as a function of previous documents viewed. This re-ranked list may be displayed as the search results 105 via the user interface module 101.

Figure 5:
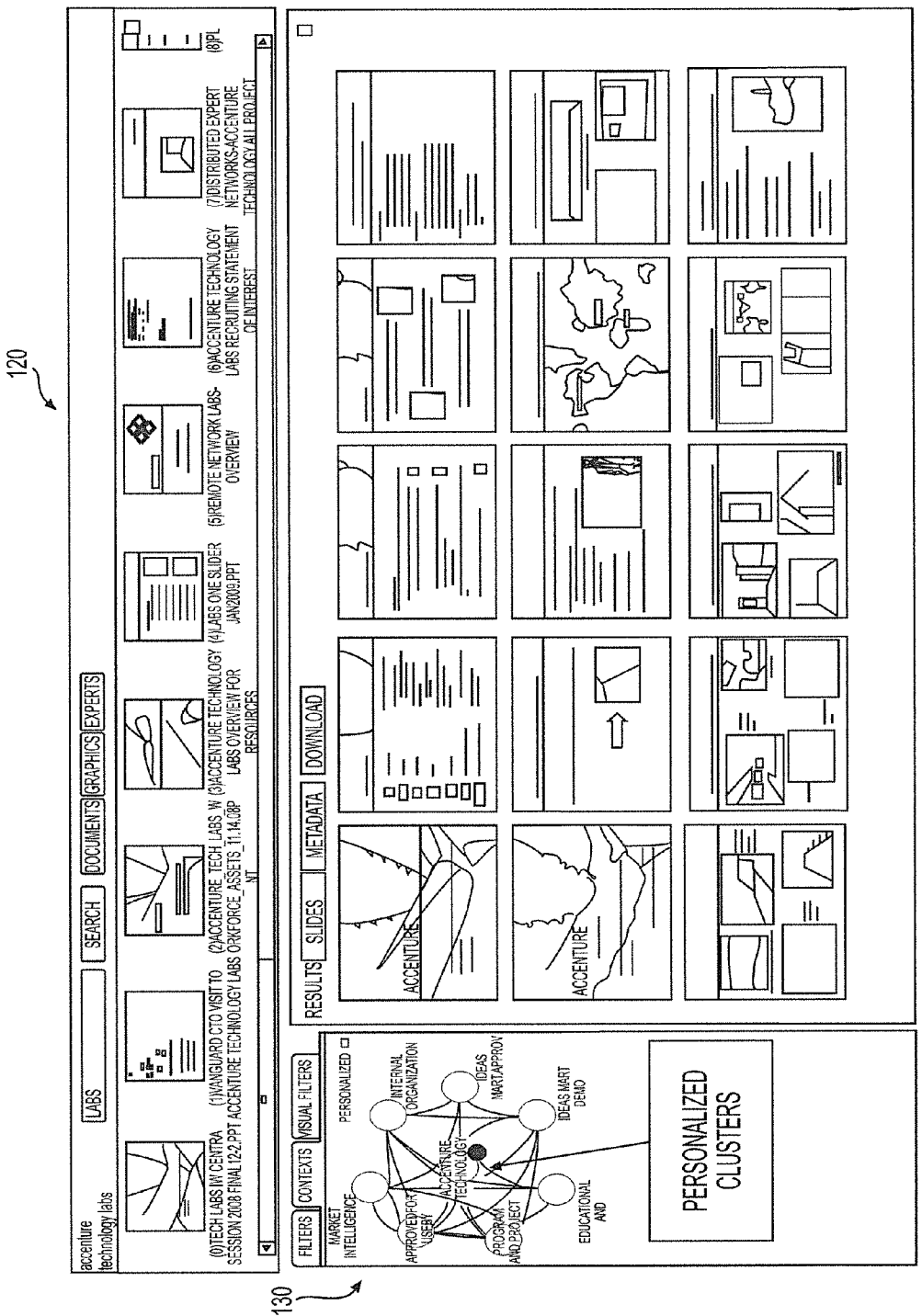
FIG. 5 illustrates an example of a screen display for the context and process based search ranking system, illustrating, for example, personalized clusters.
Figure 6:
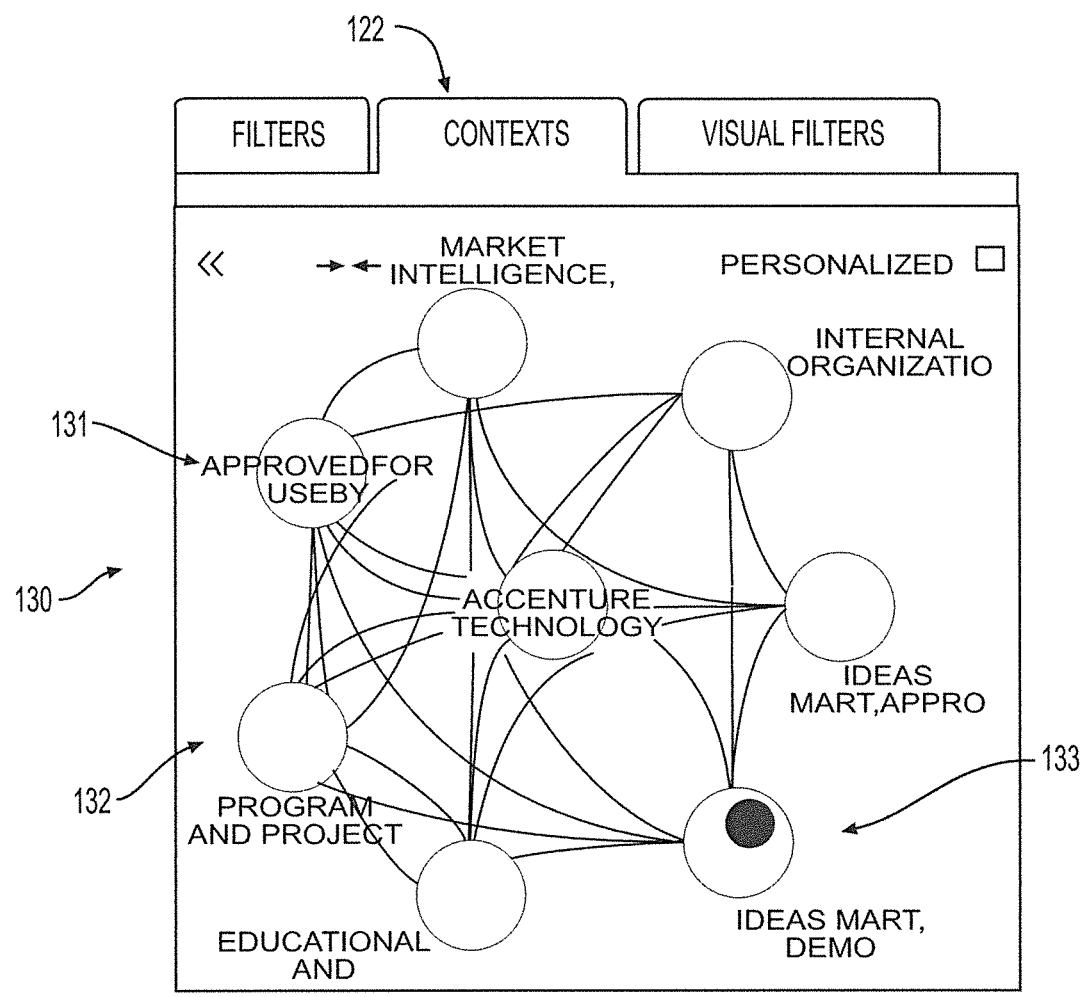
FIG. 6 illustrates an example of a section of a screen display for the context and process based search ranking system, illustrating, for example, personalized clusters.
Figure 7:
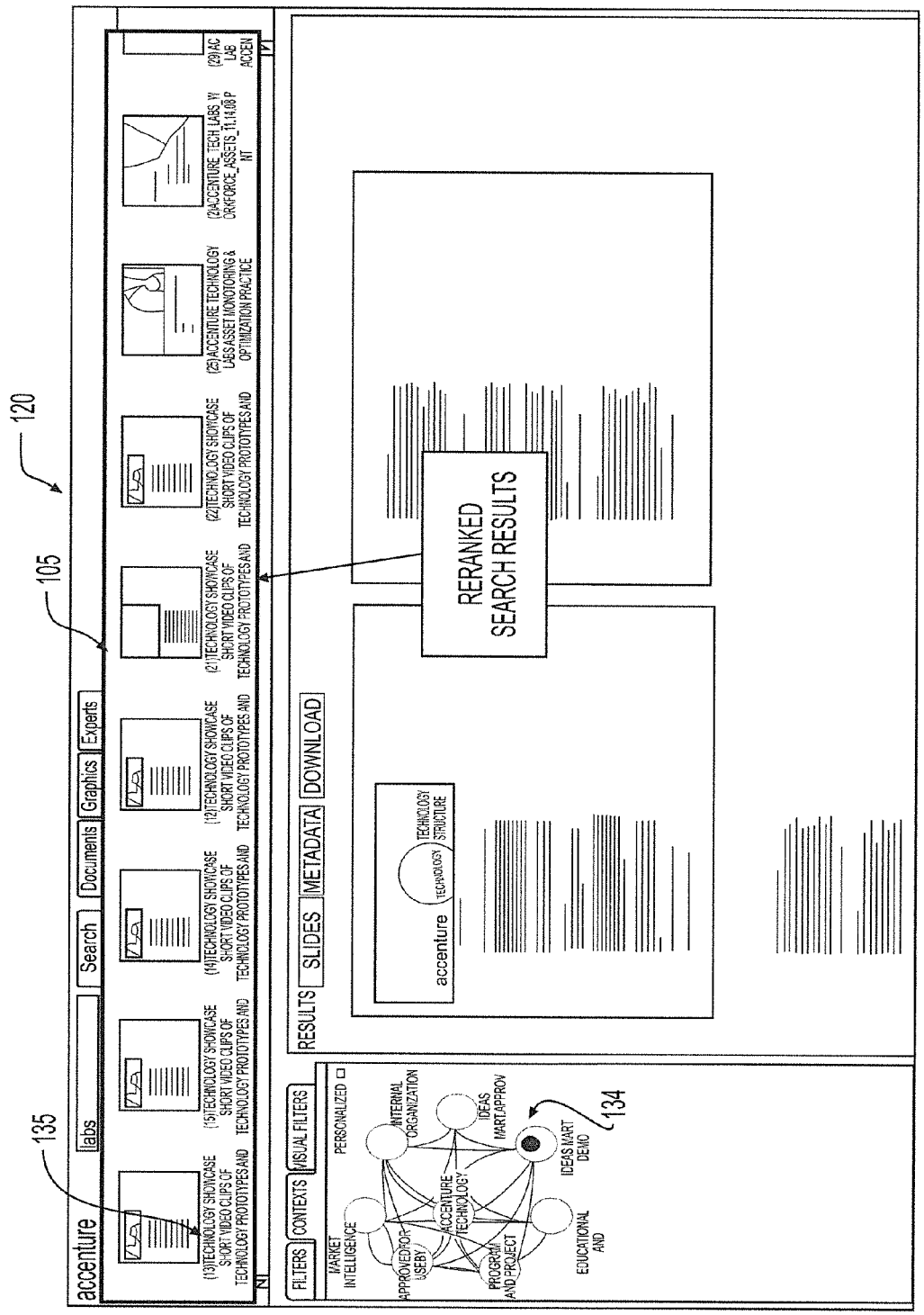
FIG. 7 illustrates an example of a screen display for the context and process based search ranking system, illustrating, for example, re-ranked search results.

Referring to FIGS. 5 and 6, as described above, based on who the user is and search behavior of similar users, the personalized context module 109 may automatically generate personalized clusters 130 based on the contexts specific to the user. For example, personalized clusters may include clusters related to "APPROVED FOR USE BY" at 131 and "PROGRAM AND PROJECT" at 132. Further, moving a cursor over a cluster may provide more information about the context. For example, moving a cursor over "IDEAS MART, DEMO" at 133 may provide information such as "ideas mart, demo prototype, labs RD area". Further, referring to FIGS. 5 and 7, clicking on a cluster or moving the marker 134 (i.e., ball; see FIG. 7) to a cluster (or in between clusters) may re-rank the search results 105, thus biasing the search results more towards the clusters near the marker 134. For example, as shown in FIGS. 5 and 7, moving the marker 134 from the "ACCENTURE TECHNOLOGY" cluster in FIG. 5 to the "IDEAS MART, DEMO" cluster in FIG. 7 may re-rank the search results from rank #13 at 135 to rank #0 (e.g., first result; note: results shown in the search results 105 of FIG. 5 include rank #0 to rank #7).

The visual filters module 115 is described with reference to FIGS. 1, 2 and 8-10.

The visual filters module 115 may display multiple filters, for example, in a two-dimensional representation labeled with the most frequent metadata values and allow the user 102 to manually select co-occurring metadata values and modify search results. The co-occurring metadata values may relate to metadata values that may co-occur (i.e., occur together) such that the document may be ranked higher than another document that may have just one of the metadata values.

Figure 8:
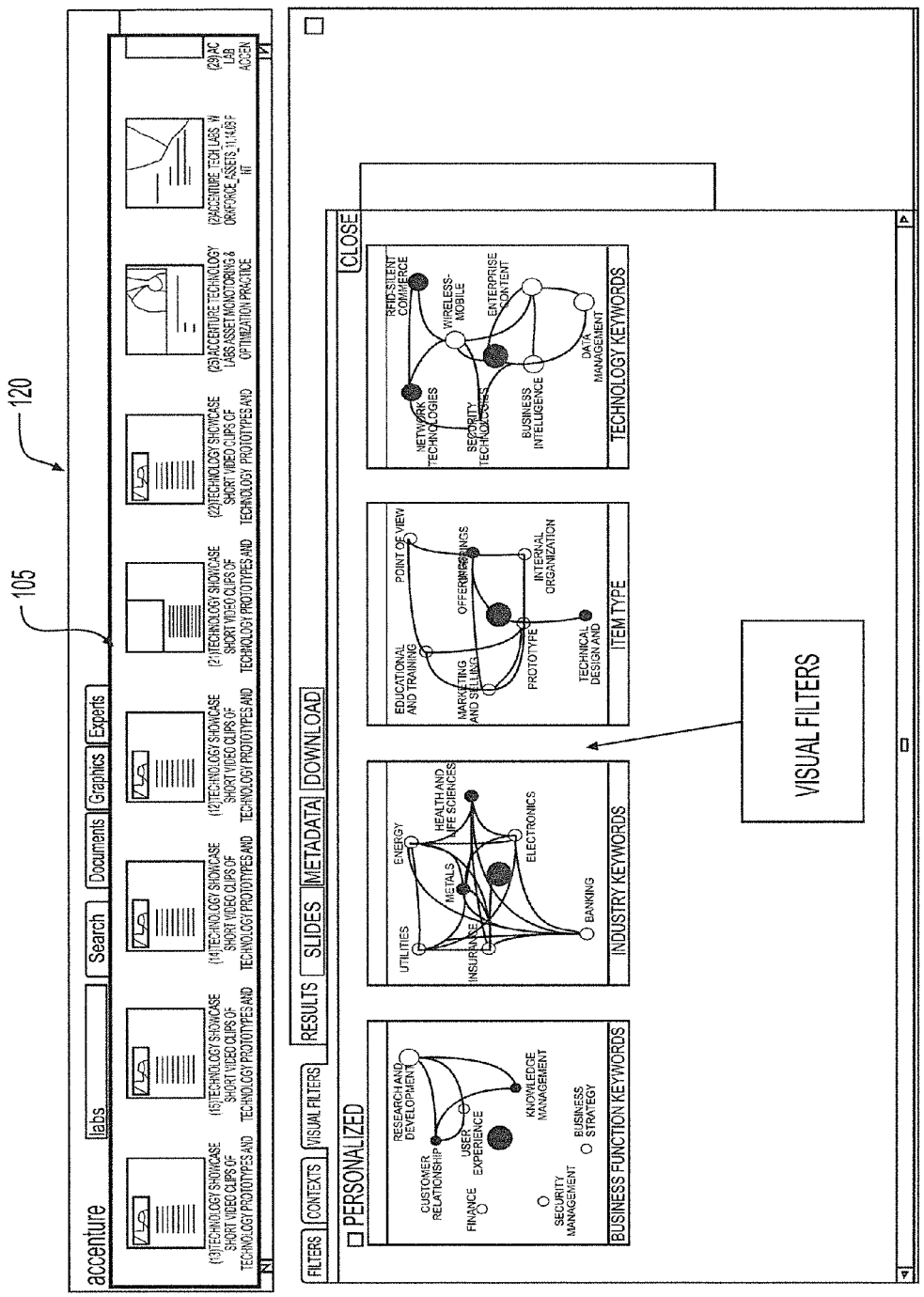
FIG. 8 illustrates an example of a screen display for the context and process based search ranking system, illustrating, for example, visual filters.
Figure 9:
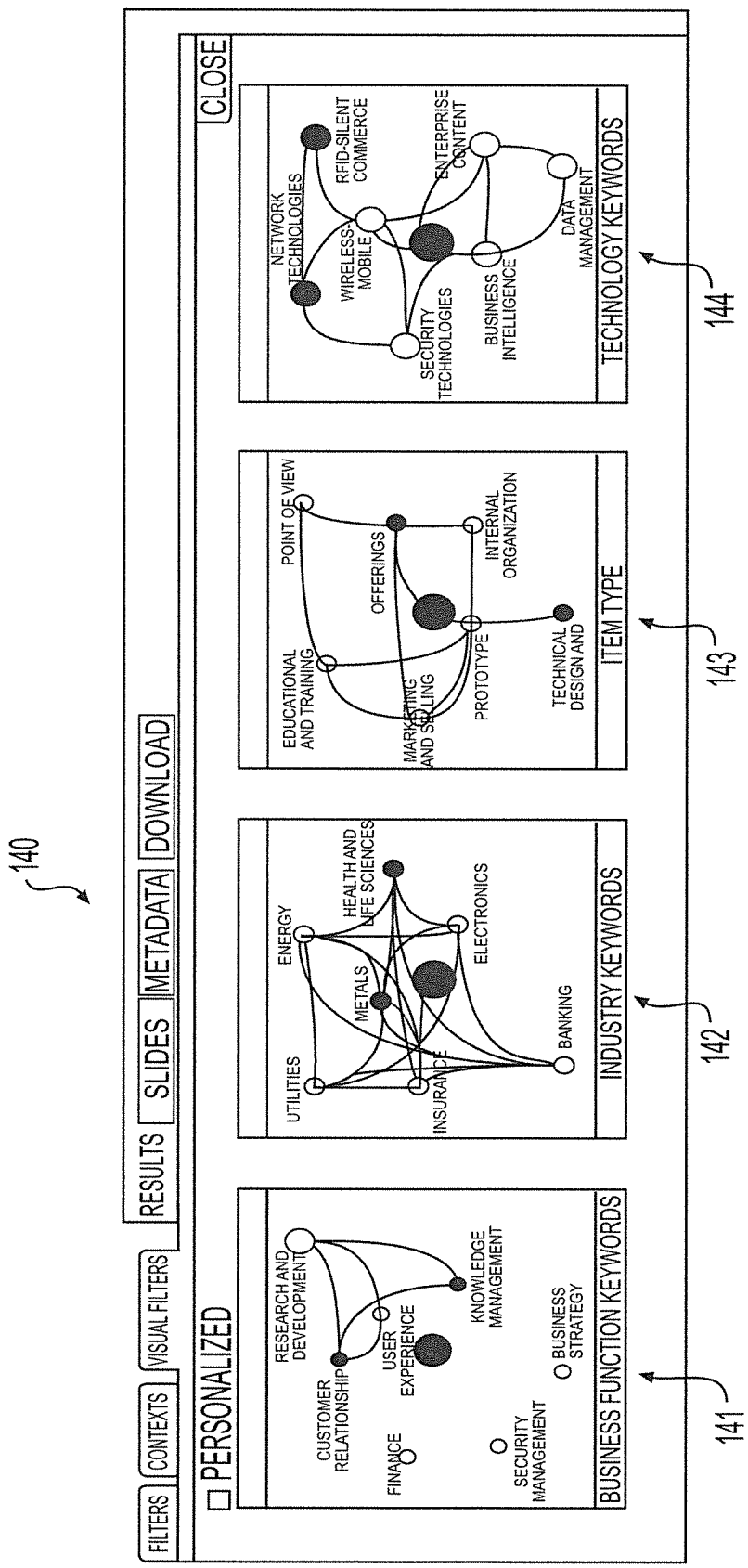
FIG. 9 illustrates an example of a section of a screen display for the context and process based search ranking system, illustrating, for example, visual filters.
Figure 10:
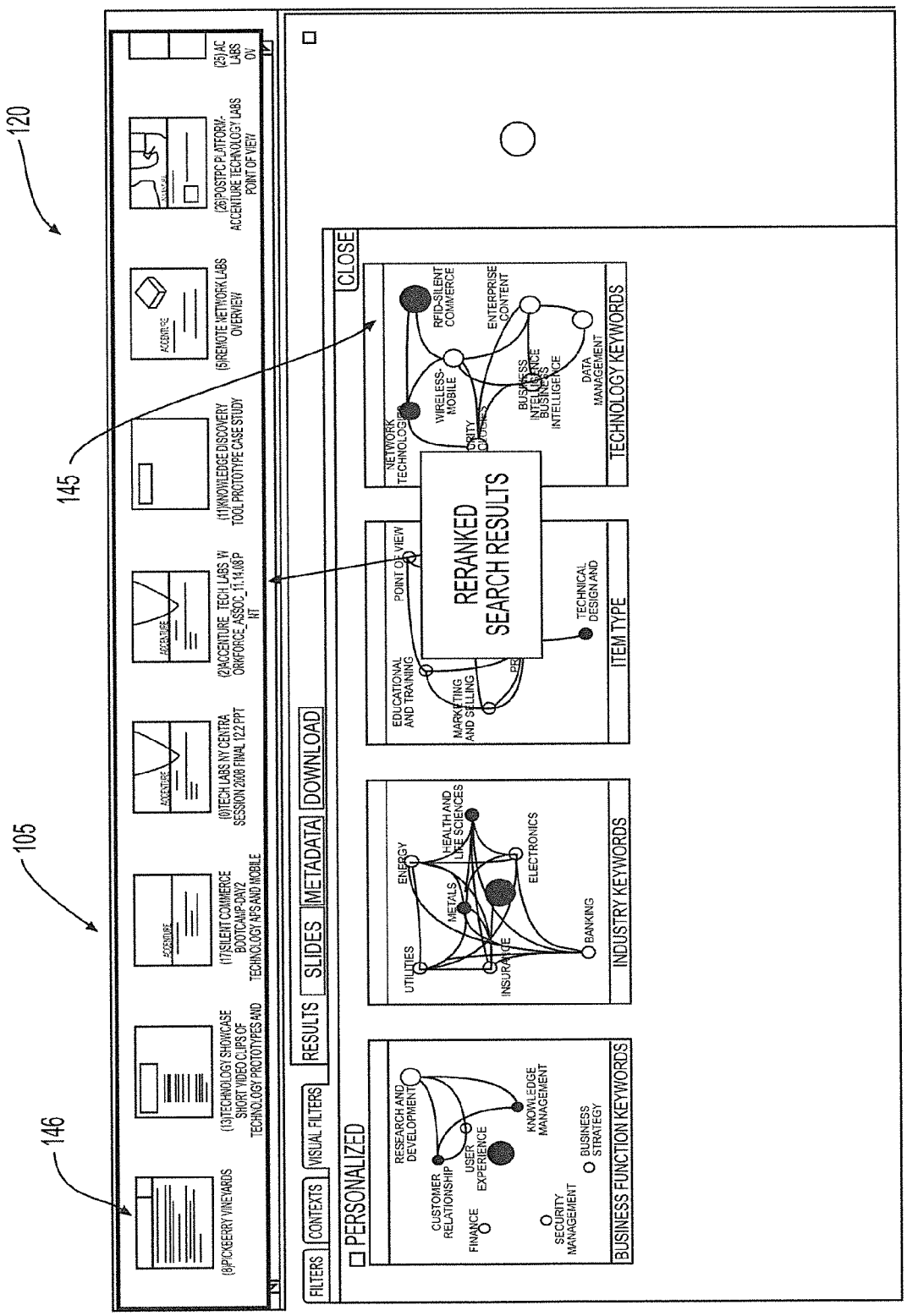
FIG. 10 illustrates an example of a screen display for the context and process based search ranking system, illustrating, for example, re-ranked search results.

Referring to FIGS. 8 and 9, visual filters 140 related, for example, to the attributes of "Business Function Keywords", "Industry Keywords", "Item Type" and "Technology Keywords", respectively, are shown at 141-144. For example, for visual filter 141 for "Business Function Keywords", documents related to finance, security management and business strategy do not have any overlapping aspects, and thus are spaced away from documents related to research and development, customer relationship, user experience and knowledge management. The links between the overlapping documents may also provide the user with a visual understanding of the degree of overlap based on the thickness of the link. For the visual filters, moving the marker 145 (i.e., ball; see FIG. 10) may re-rank the search results 105. For example, as shown in FIG. 10, moving the marker 145 from the location shown in FIG. 9 in the "Technology Keywords" filter 144 to the location shown in FIG. 10 in the same "Technology Keywords" filter 144 may re-rank the search results from rank #8 at 146 to rank #0 (e.g., first result; note: results shown in the search results 105 of FIG. 5 include rank #0 to rank #7, results shown in the search results 105 of FIG. 7 include re-ranking of the search results of FIG. 5, and results shown in the search results 105 of FIG. 10 include re-ranking of the same search results of FIGS. 5 and 7). If the focus is in-between several contexts, the documents retrieved may be re-ranked based on a weighted sum of the nearby contexts. For example, when the marker 145 is in between different contexts, the distance from the marker to the context may determine the weight in terms of re-ranking documents according to combined similarity of each of the weighted contexts. Thus, if the marker 145 is closer to one context versus another, the closer context would be assigned a higher weight with regard to re-ranking of documents.

The search collaboration module 116 is described with reference to FIGS. 1 and 2.

The search collaboration module 116 may provide semantically based social browsing. The module 116 may create awareness among users of the system 100 who are working in similar contexts or on similar tasks. The module 116 may use context information from the personalized context module 109.

Referring to FIG. 2, the search collaboration bar 127 may allow connection with users performing similar searches. A user may enter text in the chat box 150 to broadcast a message to other users performing similar searches. Clicking on another user's enterprise ID at 151 may initiate communication with that user.

3. Method

Figure 11:
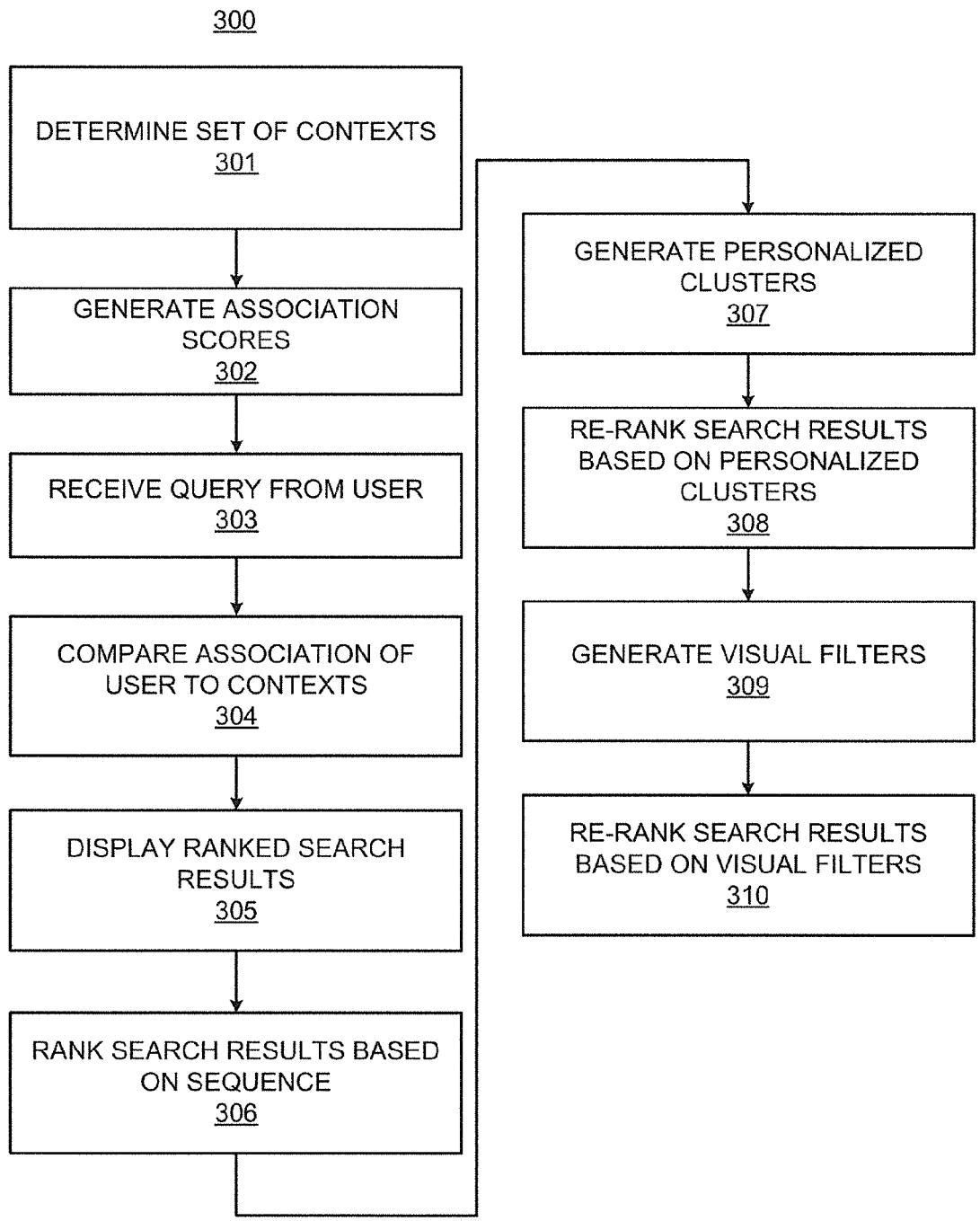
FIG. 11 illustrates a method for context and process based search ranking, according to an embodiment.

FIG. 11 illustrates a flowchart of a method 300 for context and process based search ranking, according to an embodiment. The method 300 may be implemented on the context and process based search ranking system 100 described above with reference to FIGS. 1-10 by way of example and not limitation. The method 300 may be practiced in other systems.

At block 301, the context mining module 110 may determine a set of contexts based on profile of information rankable by the system 100 and an access history of users that have accessed at least some of the information. The context mining module 110 may further determine the set of contexts based on a profile of at least one of the users. As discussed above, the information may include documents rankable by the system 100.

At block 302, the context mining module 110 may generate an association score for each of the contexts with each of the users, and a further association score for each of the contexts with the information. The association scores may be used by the context detection module 112 to rank the search results.

At block 303, as discussed above with reference to FIG. 1, the user interface module 101 may receive the query 103 from the user 102 pertaining to information in the data storage 104.

At block 304, the context detection module 112 may compare an association of the user 102 conducting a search with at least one of the contexts to thereby rank search results based on the comparison. For example, the context detection module 112 may compare the association of the user 102 conducting the search based on a user profile for the user 102. The context detection module 112 may determine an association score for the user 102 based on comparison of a user profile with the contexts of each of the users, a further association score for search result information based on comparison of the search result information with the contexts, and an overall association score based on the association scores to rank the search results. Per the query 103, the graphics search module 106 may classify and index graphics contained in the information.

At block 305, as discussed above with reference to FIGS. 1-10, the user interface module 101 may display the ranked search results 105.

At block 306, as discussed above with reference to FIGS. 1 and 2, the process mining module 111 may rank the search results based on a sequence of search result information reviewed by the user 102.

At block 307, as discussed above with reference to FIGS. 1 and 4-7, the personalized context module 109 may generate personalized clusters based on the contexts.

At block 308, as discussed above with reference to FIGS. 1 and 4-7, the resource re-ranking module 114 may be used to re-rank the search results based on manipulation of at least one of the personalized clusters.

At block 309, as discussed above with reference to FIGS. 1 and 8-10, the visual filters module 115 may generate visual filters related to most frequent metadata values related to a query by the user.

At block 310, for the visual filters, as discussed above with reference to FIGS. 1 and 8-10, the search results may be re-ranked by manipulation of co-occurring metadata values.

4. Computer Readable Medium

Figure 12:
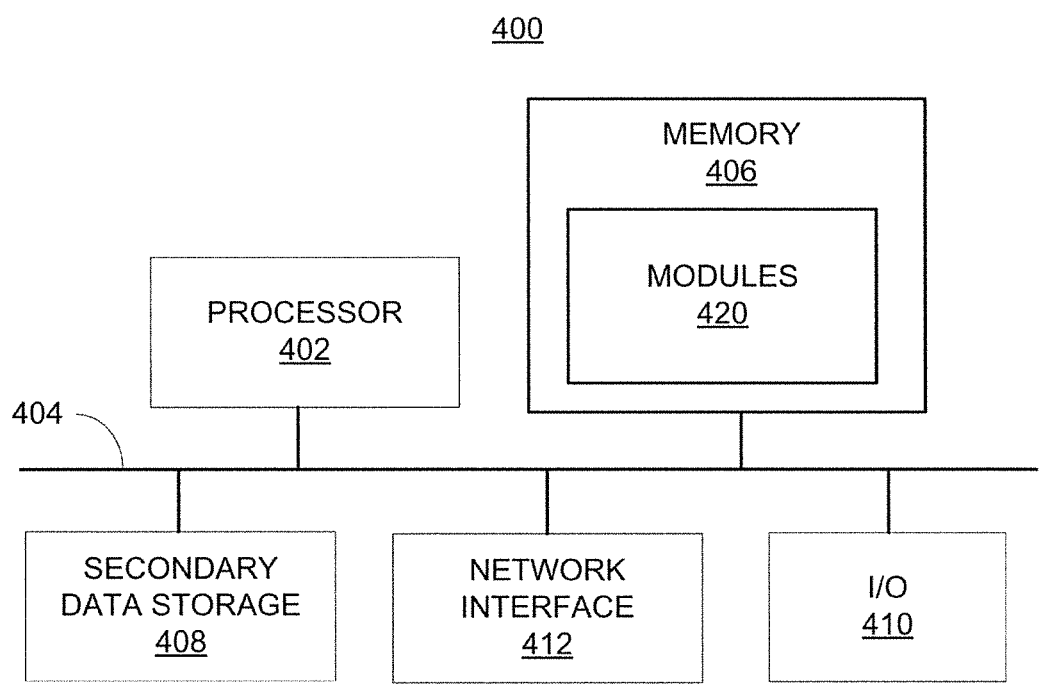
FIG. 12 illustrates a computer system, according to an embodiment.

FIG. 12 shows a computer system 400 that may be used with the embodiments described herein. The computer system 400 represents a generic platform that includes components that may be in a server or another computer system. The computer system 400 may be used as a platform for the system 100. The computer system 400 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 includes a processor 402 that may implement or execute machine readable instructions performing some or all of the methods, functions and other processes described herein. Commands and data from the processor 402 are communicated over a communication bus 404. The computer system 400 also includes a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums. The memory 406 may include modules 420 including machine readable instructions residing in the memory 406 during runtime and executed by the processor 402. The modules 420 may include the modules 101 and 106-116 of the system 100 shown in FIG. 1.

The computer system 400 may include an I/O device 410, such as a keyboard, a mouse, a display, etc. The computer system 400 may include a network interface 412 for connecting to a network. Other known electronic components may be added or substituted in the computer system 400.

While the embodiments have been described with reference to examples, various modifications to the described embodiments may be made without departing from the scope of the claimed embodiments.

What is claimed is:

1. A search ranking system comprising:
a hardware context miner, to determine a set of contexts based on profile of information rankable by the system and an access history of users that have accessed at least some of the information;
a hardware context detector to compare an association of a user conducting a search, based on a user profile for the user conducting the search, with at least one of the contexts to thereby rank search results based on the comparison;
a hardware personalized context generator to generate personalized clusters based on the contexts; and
a hardware resource re-ranker to re-rank the search results based on manipulation of at least one of the personalized clusters, wherein the manipulation of the at least one of the personalized clusters is based on a determination of movement of a marker that is displayed independently of the at least one of the personalized clusters towards or away from the at least one of the personalized clusters, and wherein the manipulation of the at least one of the personalized clusters is further based on a determination of selection of the at least one of the personalized clusters after selection of a different personalized cluster from the personalized clusters.

2. The search ranking system of claim 1, wherein the hardware context detector is to determine an association score for the user based on comparison of the user profile for the user conducting the search with the contexts of each of the users, a further association score for search result information based on comparison of the search result information with the contexts, and an overall association score based on the association scores to rank the search results.

3. The search ranking system of claim 1, further comprising a hardware process miner to rank the search results based on a frequency of a sequence of search result information reviewed by the user.

4. The search ranking system of claim 1, further comprising a hardware visual filters generator to generate filters related to most frequent metadata values related to a query by the user, wherein the search results are re-ranked by manipulation of co-occurring metadata values.

5. The search ranking system of claim 1, wherein the hardware context detector is to compare the association of the user conducting the search with a specified number of top contexts selected from the contexts to thereby rank search results based on the comparison.

6. The search ranking system of claim 1, further comprising a hardware visual filter generator to generate links of varying thickness based on a degree of overlap between contents of the information.

7. The search ranking system of claim 1, wherein the access history of the users includes aspects related to content, network, and time associated with the access of at least some of the information, wherein the content aspect is related to an information repository for the rankable information, wherein the network aspect is related to skills, within an organization, of the users that have accessed at least some of the information, and wherein the time aspect is related to a predetermined time interval of search and access logs related to the users that have accessed at least some of the information.

8. The search ranking system of claim 1, wherein the hardware context miner is to further determine the set of contexts based on a geographical location of at least one of the users.

9. The search ranking system of claim 1, wherein the access history of the users includes representation of the access of the at least some of the information as events, and wherein an event of the events includes a representation of a user of the users, information from the at least some of the information, and a time of the access of the information from the at least some of the information.

10. The search ranking system of claim 1, further comprising a hardware process miner to determine probabilities related to further search results that are to be reviewed by the user.

11. The search ranking system of claim 1, further comprising a hardware process miner to determine probabilities related to further search results that are to be reviewed by the user based on a matrix of attributes, and a matrix of information and attributes.

12. The search ranking system of claim 1, wherein the hardware personalized context generator is to generate a display of the contexts, and re-rank the search results based on selection of different ones of the displayed contexts.

13. The search ranking system of claim 12, wherein the re-ranking of the search results is based on a weighted sum of adjacent contexts.

14. The search ranking system of claim 1, further comprising a hardware visual filter generator to generate a display of filters related to most frequent metadata values related to a query by the user, wherein the search results are re-ranked based on selection of different ones of the displayed filters.

15. A method for search ranking, the method comprising:
determining, by a processor, a set of contexts based on profile of rankable information and an access history of users that have accessed at least some of the rankable information;
comparing an association of a user conducting a search, based on a user profile for the user conducting the search, with at least one of the contexts to thereby rank search results based on the comparison;
generating personalized clusters based on the contexts; and re-ranking the search results based on manipulation of at least one of the personalized clusters, wherein the manipulation of the at least one of the personalized clusters is based on a determination of movement of a marker that is displayed independently of the at least one of the personalized clusters towards or away from the at least one of the personalized clusters, and wherein the manipulation of the at least one of the personalized clusters is further based on a determination of selection of the at least one of the personalized clusters after selection of a different personalized cluster from the personalized clusters.

16. The method according to claim 15, further comprising determining an association score for the user based on comparison of the user profile for the user conducting the search with the contexts of each of the users, a further association score for search result information based on comparison of the search result information with the contexts, and an overall association score based on the association scores to rank the search results.

17. The method according to claim 15, further comprising generating filters related to most frequent metadata values related to a query by the user, wherein the search results are re-ranked by manipulation of co-occurring metadata values.

18. The method according to claim 15, wherein comparing the association of the user conducting the search, based on the user profile for the user conducting the search, with at least one of the contexts to thereby rank search results based on the comparison further comprises:
comparing the association of the user conducting the search with a specified number of top contexts selected from the contexts to thereby rank search results based on the comparison.

19. The method according to claim 15, further comprising determining the set of contexts based on a geographical location of at least one of the users.

20. A non-transitory computer readable medium having stored thereon a computer executable program for search ranking, the computer executable program when executed causes a computer system to:

determine, by a processor, a set of contexts based on profile of rankable information and an access history of users that have accessed at least some of the rankable information;

compare an association of a user conducting a search, based on a user profile for the user conducting the search, with at least one of the contexts to thereby rank search results based on the comparison;

generate personalized clusters based on the contexts; and re-rank the search results based on manipulation of at least one of the personalized clusters, wherein the manipulation of the at least one of the personalized clusters is based on a determination of movement of a marker that is displayed independently of the at least one of the personalized clusters towards or away from the at least one of the personalized clusters, and wherein the manipulation of the at least one of the personalized clusters is further based on a determination of selection of the at least one of the personalized clusters after selection of a different personalized cluster from the personalized clusters.

* * * * *

UNITED STATES PATENT AND TRADEMARK OFFICE
CERTIFICATE OF CORRECTION

PATENT NO. : 9,460,193 B2
APPLICATION NO. : 13/544551
DATED : October 4, 2016
INVENTOR(S) : Ghani et al.

Page 1 of 1

It is certified that error appears in the above-identified patent and that said Letters Patent is hereby corrected as shown below:

On the Title Page

Item (30), the foreign application priority number should read "11290372.9".

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*